United States Patent Office 2,974,159
Patented Mar. 7, 1961

2,974,159

PRODUCTION OF PRIMARY-2-HYDROXY-ETHYLPHOSPHITE

Marvin Koral, Buffalo, N.Y., assignor to Allied Chemical Corporation, New York, N.Y., a corporation of New York No Drawing. Filed June 10, 1959, Ser. No. 819,237

6 Claims. (Cl. 260—461)

This invention relates to a new and improved process for the preparation of primary-2-hydroxyethylphosphite. Primary-2-hydroxyethylphosphite having the formula

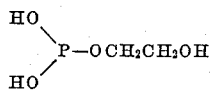

is a highly efficient fire retardant agent particularly adapted to confer to a high degree of fire retardancy upon polyurethane foams as more fully described in co-filed application Serial No. 819,243, entitled "Fire Retardant Polyurethane."

A prime object of the present invention is to provide a low cost, economical process for the production of high yields of primary-2-hydroxyethylphosphite.

In accordance with the present invention phosphorus trichloride and ethylene glycol are reacted in the proportion of at least two mols of ethylene glycol, preferably about three mols of ethylene glycol per mol of phosphorus trichloride by adding phosphorus trichloride to the ethylene glycol preferably in the presence of an inert solvent, i.e. a solvent which does not react under the conditions of the reaction, e.g. an aromatic solvent such as benzene or an aliphatic solvent such as hexane and heptane, at a temperature below about 80° C., preferably at a temperature of between 5 and 30° C. and especially between 10 and 15° C. for a sufficient period of time to effect reaction of the phosphorus trichloride and ethylene glycol to produce primary-2-hydroxyethylphosphite. Advantageously, the reaction is continuously purged with a stream of inert gas, for example nitrogen, in order to remove hydrogen chloride formed by the reaction. When the reaction is complete, as evidenced by the diminution of the evolution of hydrogen chloride, the mass is distilled to remove ethylene chlorohydrin, a by-product formed in reaction, solvent, if used, and unchanged glycol. The product which remains can be used directly. Alternatively, the crude produced can be purified by distillation in vacuo or by treatment with charcoal. Yields of from 60% to over 95% of theory (based on PCl₃) are obtained.

In carrying out the process of the present invention ethylene glycol, preferably dissolved in an inert solvent such as benzene, or normal hexane, generally in an amount of solvent ranging from about ½ volume to 1.5 volumes of ethylene glycol is disposed in a reaction vessel equipped to maintain the temperature of the ethylene glycol below about 80° C., preferably between 5° and 30° C. To the ethylene glycol in the reaction vessel is gradually added phosphorus trichloride in the proportion of not more than 1 mol of phosphorus trichloride for 2 mols of ethylene glycol, preferably in the proportion of 1 mol phosphorus trichloride for 3 mols of ethylene glycol while maintaining the temperature below 80° C. During the reaction, hydrogen chloride is formed which may be removed by passing nitrogen through the reaction mass. After addition of phosphorus trichloride the reaction mass is permitted to stand until the evolution of hydrogen chloride has ceased. The resulting reaction mixture is fractionally distilled to remove a solvent, if present, and ethylene chlorohydrin. The residue is primary-2-hydroxyethylphosphite which can be purified by treatment with decolorizing carbon or by distillation in vacuo.

Although the course of the reaction is not known with certainty it is believed that the process occurs in two steps which may be indicated by the following equations:

Step 1 involves the replacement by glycol of one of the chlorine atoms of phosphorus trichloride

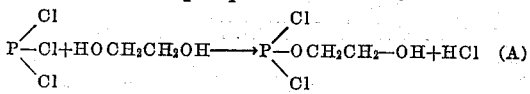

Step 2 involves the reaction of 2 mols of glycol with the dichlorohydroxyethylphosphite produced in step 1 to produce ethylene chlorohydrin and the desired primary-2-hydroxyethylphosphite

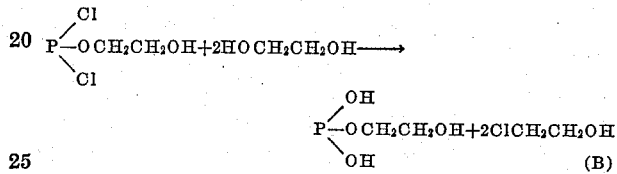

Thus by adding the above equations, the process may be represented by

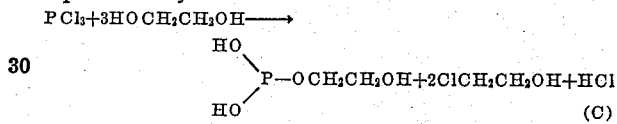

In accordance with this equation it will be seen that 1 mol of phosphorus trichloride requires 3 mols of glycol for complete reaction. It has been found, however, that when using at least 2 mols of glycol, yields of at least 60% of primary-2-hydroxyethylphosphite are obtained, and some dichlorethane has been identified in the reaction mass. It can be deduced, therefore, that in step 2 only one mol of glycol is reacting as follows:

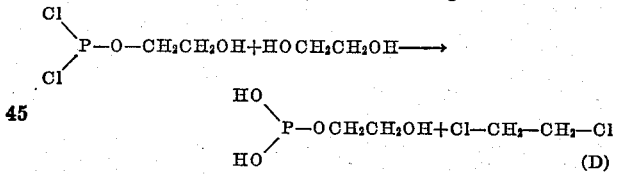

By adding Equations A and D the reaction mechanism can be formulated

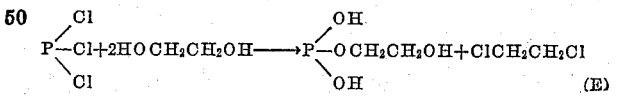

Accordingly, while the presence of three or more mols of glycol can be said to favor the reaction as expressed by Equation C, the synthesis of hydroxyethylphosphite proceeds in the presence of only two mols of glycol according to Equation E.

The following examples illustrate the process of the present invention. Parts are by weight and temperatures are given in degrees centigrade.

*Example 1*

To a solution of 2055 parts (33.1 mols) of ethylene glycol in 1000 parts of benzene, 1520 parts (11 mols) of phosphorus trichloride were added gradually while maintaining the temperature of the mixture between 10° and 15°. The evolved hydrogen chloride was swept out of the reaction vessel by passing a vigorous stream of nitrogen through the reactor. Thereafter the mixture was agitated without further temperature control for about 16 hours. The mass had separated into two layers.

The benzene layer was separated and evaporated to dryness on a steam bath. The residue was added to the product layer which was then distilled in vacuo. The initial fraction boiling at 58° to 66°/24 mm. was collected and identified as ethylene chlorohydrin. A second fraction consisting of ethylene glycol was collected at 74° to 82°/2 mm. The residue was treated with decolorizing carbon to yield 1350 parts (97.4% of theory based on phosphorus trichloride) of a colorless liquid which was identified as primary-2-hydroxyethylphosphite by the following analysis:

| For $C_2H_7O_4P$ | Calculated | Found |
|---|---|---|
| Neutral Equivalent | 126 | 128 |
| Acid No | 445.2 | 429.5 |

*Example 2*

152 parts (1.1 mols) of phosphorus trichloride were added gradually to a solution of 205.5 parts (3.3 mols) of ethylene glycol dissolved in 100 parts of "Skellysolve C" (a commercially available hydrocarbon mixture boiling in the range of heptanes, product of Skelly Oil Co.) at a temperature within the range of 10° to 15°. The resultant mixture was permitted to warm up to about 25° while being agitated for about 16 hours. Thereafter the mass was stripped of solvent, ethylene chlorohydrin and unreacted glycol and the residue was distilled in vacuum. 90 parts of primary-2-hydroxyethylphosphite, B.P. 147° to 153°/3 mm., representing a yield of 65% of the theoretical amount obtainable were obtained.

From the above illustrative examples, it is evident that an improved means has been devised for the preparation of anhydrous primary-2-hydroxyethylphosphite in high yields. The reaction of ethylene glycol with phosphorus trichloride to produce primary-2-hydroxyethylphosphite, namely a glycol containing two primary alcohol groups, is not the same as reactions between related glycols and phosphorus trichloride. Specifically, the reaction mixture obtained using diethylene glycol decomposed during distillation of the reaction mixture. 1,4-butylene glycol on treatment with phosphorus trichloride gave a highly colored reaction mixture which was evidence of the formation of by-products and unsatisfactory reaction. Other 1,2-glycols containing secondary alcohol groups would be effected by the relative inactivity of the secondary alcohol group.

Many variations in the details of the illustrative examples are possible. For example, the initial reaction temperature, that is the temperature of mixing the glycol and phosphorus trichloride, can be within the range of about −5° C. to about 80° C. It has been found that it is preferable to add phosphorus trichloride to the glycol at between 5° and 30° C. and especially at between 10° and 15° C. At temperatures above and below these limits, the yield of desired product is depreciated. Reversal of the order of addition, i.e. addition of the glycol to the phosphorus trichloride results in a different course of reaction yielding a mixture of products.

Also, the use of a solvent is preferred since it results in a smoother reaction. Aromatic solvents such as benzene, toluene or xylene, aliphatic hydrocarbon solvents such as heptanes, hexanes or octanes are typical of the organic solvents which are characterized by their inertness under the conditions of the reaction, and which therefore are suitable for use in the process.

The molar proportions of the reactants which can be used can be varied from at last 2 mols of glycol to 1 mol of phosphorus trichloride to 3 or more mols of glycol per mol of phosphorus trichloride. The optimum yield is obtained when the mol ratio of reactants is about 3:1 and preferably should not exceed about 4:1. The use of more glycol is not recommended since such excess does not enter into the reaction and merely increases the amount of this substance which must be recovered. Less glycol than the 2:1 mol ratio results in low yields of product.

I claim:
1. A process for the production of primary-2-hydroxyethylphosphite which comprises reacting phosphorus trichloride and ethylene glycol in the proportion of at least 2 mols of ethylene glycol per mol of phosphorus trichloride by adding the phosphorus trichloride to the ethylene glycol at a temperature below about 80° C. and maintaining the reaction mixture for a sufficient period of time to effect reaction of the phosphorus trichloride and ethylene glycol to produce primary-2-hydroxyethylphosphite.

2. A process for the production of primary-2-hydroxyethylphosphite which comprises reacting phosphorus trichloride and ethylene glycol in the proportion of at least 2 mols of ethylene glycol per mol of phosphorus trichloride by adding the phosphorus trichloride to the ethylene glycol in the presence of an inert solvent at a temperature below about 80° C. and maintaining the reaction mixture for a sufficient period of time to effect reaction of the phosphorus trichloride and ethylene glycol to produce primary-2-hydroxyethylphosphite.

3. A process for the production of primary-2-hydroxyethylphosphite which comprises reacting phosphorus trichloride and ethylene glycol in the proportion of at least 2 mols of ethylene glycol per mol of phosphorus trichloride by adding the phosphorus trichloride to the ethylene glycol at a temperature below about 80° C., maintaining the reaction mixture for a sufficient period of time to effect reaction of the phosphorus trichloride and ethylene glycol to produce primary-2-hydroxyethylphosphite, and removing hydrogen chloride formed by the reaction by passing a stream of inert gas through the reaction mixture.

4. A process for the production of primary-2-hydroxyethylphosphite which comprises reacting phosphorus trichloride and ethylene glycol in the proportion of at least 2 mols of ethylene glycol per mol of phosphorus trichloride by adding the phosphorus trichloride to the ethylene glycol in the presence of an inert solvent at a temperature below about 80° C., maintaining the reaction mixture for a sufficient period of time to effect reaction of the phosphorus trichloride and ethylene glycol to produce primary-2-hydroxyethylphosphite, and removing hydrogen chloride formed by the reaction by passing a stream of inert gas through the reaction mixture.

5. A process for the production of primary-2-hydroxyethylphosphite which comprises reacting phosphorus trichloride and ethylene glycol in the proportion of 2–4 mols of ethylene glycol per mol of phosphorus trichloride by adding the phosphorus trichloride to the ethylene glycol at a temperature between 5 and 30° C. and maintaining the reaction mixture for a sufficient period of time to effect reaction of the phosphorus trichloride and ethylene glycol to produce primary-2-hydroxyethylphosphite.

6. A process for the production of primary-2-hydroxyethylphosphite which comprises reacting phosphorus trichloride and ethylene glycol in the proportion of about 3 mols of ethylene glycol per mol of phosphorus trichloride by adding the phosphorus trichloride to the ethylene glycol in the presence of an inert solvent at a temperature between about 10 and 15° C., maintaining the reaction mixture for a sufficient period of time to effect reaction of the phosphorus trichloride and ethylene glycol to produce primary-2-hydroxyethylphosphite, and passing a stream of inert gas through the body of reactant undergoing reaction to remove hydrogen chloride formed by the reaction.

References Cited in the file of this patent
UNITED STATES PATENTS
2,864,847     Mangham _____ Dec. 16, 1958
FOREIGN PATENTS
968,486     Germany _____ Feb. 27, 1958